United States Patent [19]
Harrod et al.

[11] 3,796,947
[45] Mar. 12, 1974

[54] ELECTRON BEAM TESTING OF FILM INTEGRATED CIRCUITS

[75] Inventors: William Lee Harrod, Oak Brook; David Karl Hindermann, Naperville; John Michael Sebeson, Chicago, all of Ill.

[73] Assignee: Bell Telephone Laboratories, Incorporated, Murray Hill, Berkeley, Calif.

[22] Filed: Feb. 27, 1973

[21] Appl. No.: 336,261

[52] U.S. Cl.............................. 324/51, 324/158 P
[51] Int. Cl........................................... G01r 31/02
[58] Field of Search .................... 324/51, 54, 158 P

[56] References Cited
UNITED STATES PATENTS

| | | | |
|---|---|---|---|
| 3,373,353 | 3/1968 | Harris | 324/54 |
| 3,448,377 | 6/1969 | Seiwatz et al. | 324/54 |
| 3,531,716 | 9/1970 | Tarui et al. | 324/51 |
| 3,549,999 | 12/1970 | Norton | 324/51 X |

OTHER PUBLICATIONS

Engel et al., Electron Beam Testing of wired or Printed Circuit Modules, J. Phys. D: Appl. Phys., 1970, Vol. 3, pp. 1505–1508

*Primary Examiner*—Gerard R. Strecker
*Attorney, Agent, or Firm*—John C. Albrecht

[57] ABSTRACT

The application discloses apparatus for testing integrated circuit boards for continuity and isolation of conductive paths on the boards without physical connections to the elements under test. The electrical states of the elements of a board are obtained by observation of the time dependence of secondary electron emission when the elements are the targets of a controllable electron beam which is selectively addressed to the elements under test.

6 Claims, 6 Drawing Figures

ELECTRON BEAM TESTING OF FILM INTEGRATED CIRCUITS

FIELD OF THE INVENTION

This invention is a method of testing and apparatus for testing electrical circuits for continuity and isolation of conductive paths.

BACKGROUND OF THE INVENTION

Circuit boards of the type tested in accordance with the illustrative embodiment of the present invention typically comprise a substantial number of plated or etched conductive paths which are selectively connected and which lie in relatively complex patterns on a non-conductive board. It is desirable to be able to test such boards rapidly prior to the time the circuit components, e.g., integrated circuit chips, discrete resistors, capacitors, etc., are placed on the board and before connectors are placed on the boards. Such prior testing can eliminate circuit faults and thereby simplify the task of testing the boards after the circuit components and the connectors have been affixed thereto. Heretofore, circuit boards have been tested by placing the board in a jig which includes a pluarlity of conductive test probes which can be brought into electrical contact with the elements of the board. Because of the physical tolerances involved in such prior art testing, this task is quite time-consuming and costly. A similar but somewhat different problem exists in the testing of circuit boards on which the circuit elements and the connector have been attached and one surface of the board encapsulated in a non-conductive dielectric material. In this latter situation it is possible to provide power and control signals to the circuit elements of the board through the aforenoted connector. However, priorly in order to test such circuit boards it has been necessary to make physical connection to the conductive paths by means of probes which pierce the nonconductive dielectric or by removing the dielectric cover. As can be readily envisioned, this is an even more time-consuming and difficult task than the testing of boards prior to the deposition of the encapsulant. A similar problem exists in the testing of the elements of integrated circuit chips. The principal difference is one of size.

SUMMARY OF THE INVENTION

In accordance with the invention, the electrical states of electrical elements are obtained by observation of the time dependence of secondary electron emission when the elements under test are the targets of a controllable electron beam which is selectively addressed thereto.

The method in accordance with this invention comprises the steps: (a) conditioning an element; (b) directing an electron beam of an appropriate energy level to an element; and (c) measuring the secondary electron emission from the target elements and generating discrete signals defining the time dependence of that secondary electron emission.

The apparatus in accordance with the present invention comprises: means for positioning a circuit under test, means for generating a controllable electron beam, means for selectively positioning the electron beam on electrical elements, and means for measuring the secondary electron emission from the target elements and for generating discrete output signals representing the time dependence of that secondary electron emission.

The invention will be understood from the following detailed description when read with reference to the drawing in which.

DETAILED DESCRIPTION

Figure 1:
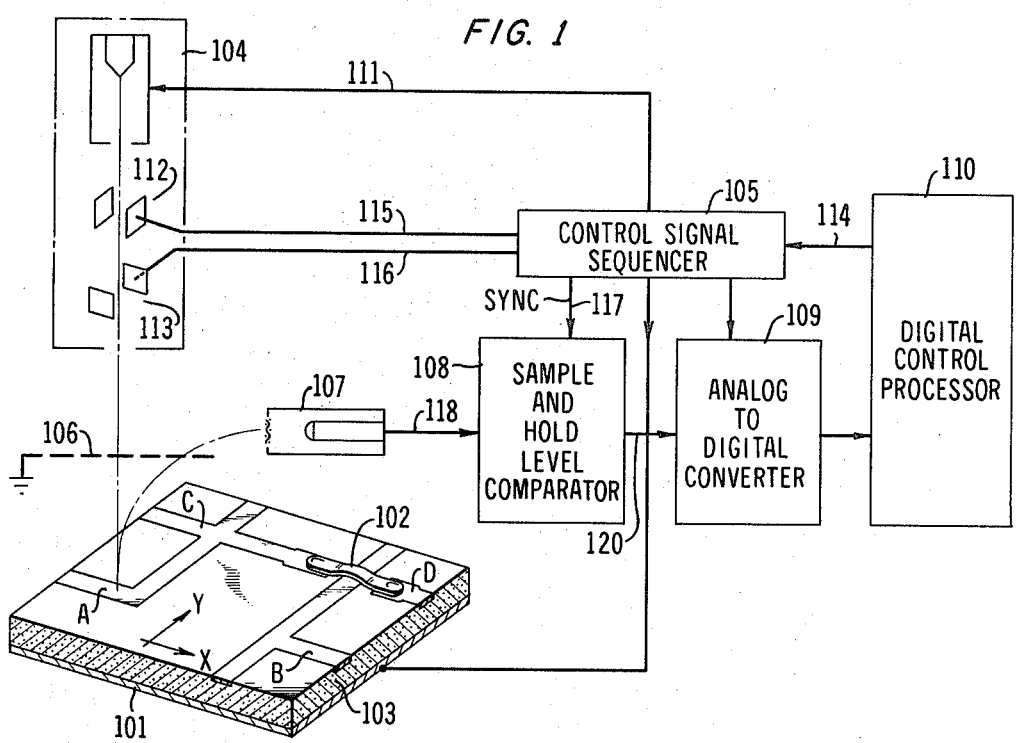
FIG. 1 shows in schematic form apparatus for testing a circuit board for continuity and isolation of circuit elements.

An illustrative arrangement for testing the conductive paths of a nonencapsulated cicruit board in accordance with the present invention is shown in FIG. 1. A section of a typical circuit board shown in FIG. 1 comprises a conductive backplate 101, the conductors A, B, C, and D, the crossover 102, and the nonconductive substrate 103. In an illustrative test sequence steps are taken to determine whether or not continuity exists between the conductors A, C, and D and whether or not the conductors A, C, and D are isolated from the conductor B. This test sequence will serve to illustrate the method and the apparatus of this invention.

The testing apparatus comprises the controllable electron beam signal source 104, the control signal sequencer 105, the barrier grid 106, the detector 107, the sample and hold level comparator 108, the analog to digital converter 109, and the digital control processer 110. The barrier grid 106 is placed between the electron beam source and the circuit board and the coplanar with and spaced apart from the board. The grid 106 passes the secondary electrons which are of sufficient energy to overcome the field of the grid. The control signal sequencer 105 provides signals via the conductor group 11 to selectively turn on and turn off the electron beam source 104, provides deflection control signals to deflection plates 112, 113, to position the electron beam and controls the potential on the backplate 101.

Figure 2:
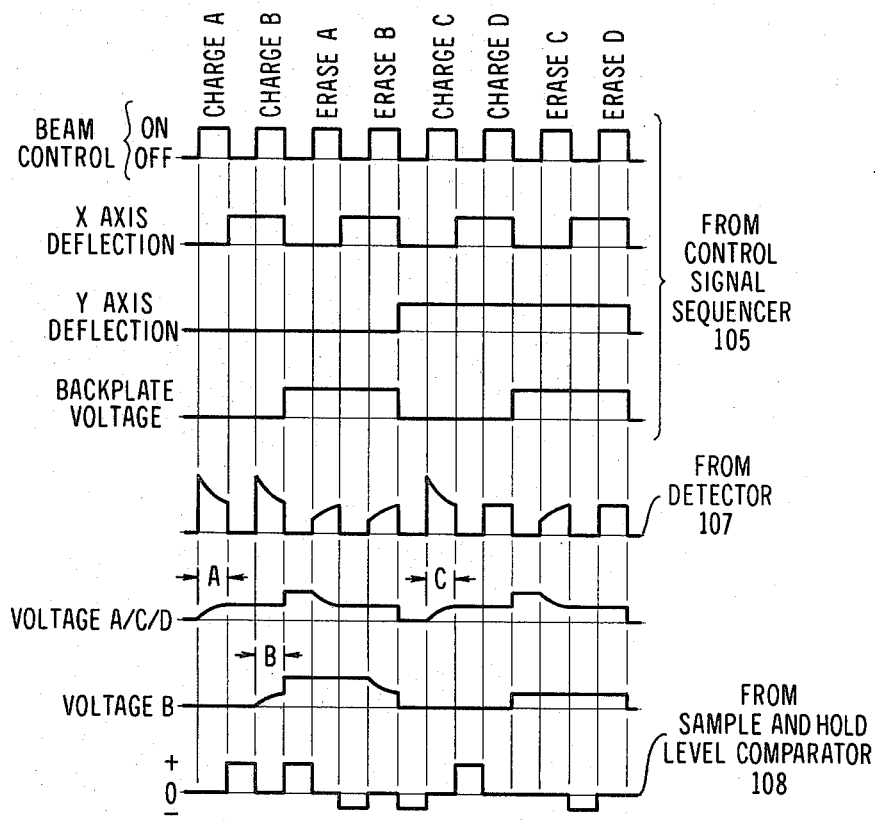
FIG. 2 is a time diagram showing control and output signals of FIG. 1.

It is assumed that the illustrative circuit board under test is held rigidly in a jig (not shown). The digital control processor 110 generates control signals which are transmitted to the control signal sequencer 105 via the conductor group 114. The control signal sequencer 105, in turn, generates on and off control signals on the conductor group 111, beam deflecting signals on the conductors 115, 116, control signals for the backplate 101, and synchronizing signals for the sample and hold level comparator on conductor 117. A typical sequence of control signals utilized in the illustrative embodiment of FIG. 1 and resultant signals are illustrated in FIG. 2. A more complete understanding of the operation of the test apparatus of FIG. 1 can be obtained by an understanding of these control sequences and the resulting signals.

The first line of FIG. 2 shows an output signal of the control signal sequencer 105 which serves to turn the electron beam on and off at a fixed rate such that the on times and the off times are approximately equal. Equality of off time and on time and pulsing at a fixed repetition rate is not necessary to the practice of this invention but rather merely serves to illustrate the principles of the invention.

Figure 6:
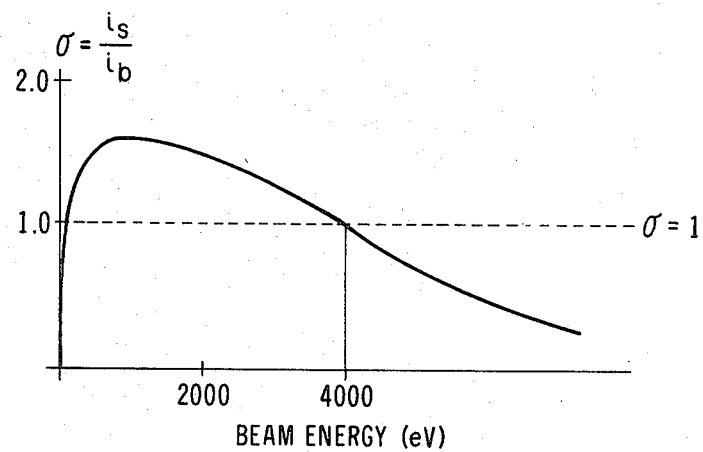
FIG. 6 is a typical graph of secondary emission as a fraction of beam energy for a given material, e.g., gold.

The X axis deflection voltages and the Y axis deflection voltages shown in lines 2 and 3 of FIG. 2 serve to position the beam first, alternately on conductors A and B, and then alternately on conductors C and D. The waveform of the voltage which is applied to the backplate 101 is shown in the fourth line of FIG. 2. The backplate voltage is pulsed in a positive direction during the time that a charge is erased on the target conductors, e.g., A and B. It should be noted that the amplitudes of the waveforms of the first four lines of FIG. 2 are not intended to be of particular significance. However, the shapes of the waveforms of lines 5 through 7 of FIG. 2 and their relative amplitudes are of interest to an understanding of the principles of this invention. The shapes of the waveforms at the output of the detector 107 are of particular interest to an understanding of this invention. These waveforms take three basic steps which are illustrated in FIG. 2 under the headings Charge A, Erase A, and Charge D. These three waveforms illustrate the time dependence of secondary electron emission from a targeted element, e.g., the conductor A of FIG. 1 under three conditions of interest. The first waveform, namely, the waveform under the heading Charge A in FIG. 2, defines the time dependence of the secondary electron current from a priorly uncharged element, namely, the conductor A of FIG. 1. With the understanding that the backplate 101 is at a particular voltage, e.g., ground, and the grid 106 is similarly at a fixed voltage, an electrically floating element such as the conductor A in FIG. 1, when targeted with an electron beam from the source 104, will tend to charge to an equalibrium state assuming the electron beam is on for a sufficient period of time. It is assumed that the energy of the electron beam is chosen to be of a value such that the ratio of the secondary electron current to the beam current is greater than 1. A typical curve for a target element showing the ratio of secondary electron emission as a function of beam energy is shown in FIG. 6. Under these conditions, electrons will be removed from the target conductor and the conductor will charge in a positive direction until equilibrium is reached between the floating conductor and the barrier grid 106, i.e., the floating conductor is at a small positive voltage with respect to the barrier grid 106. The magnitude of this voltage is such that the number of secondary electrons from the target element which escape the retarding field between the floating conductor and the barrier grid 106 are equal in number to the number of electrons incident upon the element from the electron beam source 104. At equilibrium no further charging of the element takes place.

Figure 5:
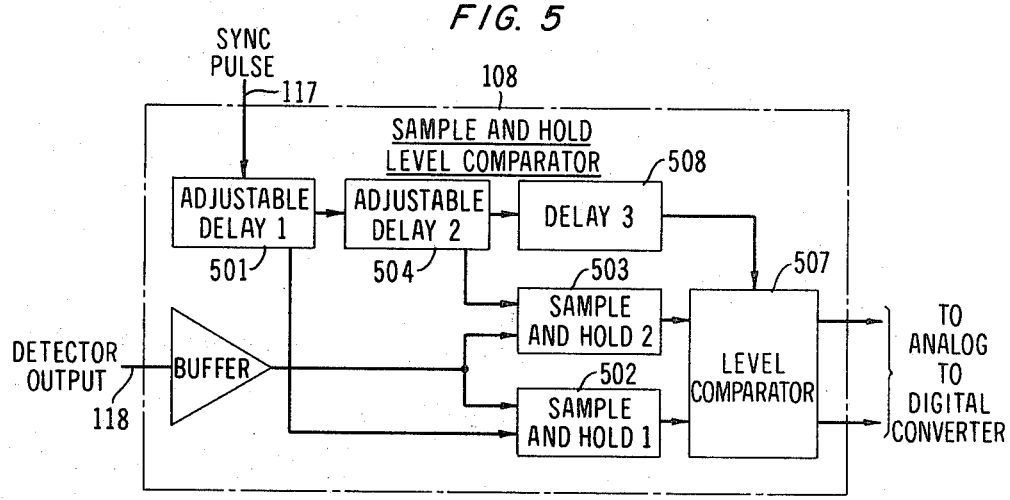
FIG. 5 is a schematic diagram of a sample and hold level comparator of FIG. 1.

The waveform at the output of the detector 107, as shown under the heading Charge A in FIG. 2, shows clearly the time dependence of the secondary electron current. At the beginning of the charging interval, the secondary electron current is high and as the conductor A approaches equilibrium the secondary electron current from that target conductor falls off rapidly to an equilibrium level. This falling waveform and the other waveforms from the detector 107 are processed in the sample and hold level comparator 108 which is shown as a block in FIG. 1 and shown in schematic functional form in FIG. 5. The operation of the sample and hold level comparator of FIG. 5 is synchronized to a synchronizing pulse transmitted from the control signal sequencer 105 via the path 117. The synchronizing pulse is delayed in the circuit 501, the output of which is applied to a first sample and hold circuit 502. This first circuit 502 serves to sample the output pulse of the detector 107 at the beginning of that pulse and a signal corresponding to the instantaneous amplitude of that pulse is stored for subsequent comparison with a signal stored in the second sample and hold circuit 503. The synchronizing pulse on conductor 117 is further delayed in the delay circuit 504, the output of which is applied to the second sample and hold circuit 503. The second sample and hold circuit under this synchronization samples the trailing edge of the output wave of the detector 107 and stores a signal corresponding to the instantaneous amplitude of the detector output signal at the trailing edge. The two signals stored in the first and second sample and hold circuits are applied to the level comparator circuit 507 which is synchronized to the output of the third delay circuit 508. The level comparator circuit 507 is a difference amplifier which generates a positive signal, e.g., the first signal in the last line of FIG. 2, upon occurrence of the falling waveform from the detector 107 shown in line 5 of FIG. 2 under the heading Charge A. The positive signal at the output of the comparator circuit 507 is displaced in time from the above noted falling waveform because of the delay of the synchronizing pulse on conductor 117 through the three delay elements 501, 504, and 508. The delayed sync pulse is applied to the comparator 507 to provide the output signal shown in the last line of FIG. 2.

The level comparator circuit 507, upon the occurrence of a rising waveform from the detector 107 and shown under the heading Erase A, generates a negative pulse such as the third pulse in the last line of FIG. 2. This pulse also is displaced from the corresponding output pulse of the detector 107 for the reasons set forth above. Upon the occurrence of a flat-topped pulse from the level detector 107, e.g., the pulse under the heading Charge D, the signal from the circuit 108 is a zero level pulse as shown in the last line of FIG. 2. In summary, the level comparator circuit 507 in the sample and hold level comparator circuit 108 generates a positive pulse when a falling pulse from the detector 107 is applied to the circuit 108, generates a negative pulse when a rising waveform from the detector 107 is applied to the circuit 108, and provides a zero level output signal upon the occurrence of a flat top pulse from the detector 107. The output signals of the sample and hold level comparator circuit 108 of FIG. 1 are applied to the analog to digital converter 109 over the transmission path 120. The analog to digital converter 109 generates digital signals which represent the sign and the amplitude of the output signals of the circuit 108. The amplitude of the positive and negative signals at the output of the circuit 108 are reflective of the slope of the waveforms applied thereto. This is seen in a general quantitive sense in that the absolute value of the slope of the falling waveforms shown in the line labled "From Detector 107" in FIG. 2 is greater than the absolute value of the slope of the rising waveforms shown in that line. Accordingly, the positive pulses generated in response to the falling waveforms, i.e., the waveforms with the greater slope, are of greater amplitude than the negative pulses resulting from the rising waveforms.

On the basis of the above understanding of the operation of the circuit arrangement of FIG. 1, it is possible to proceed to a discussion of the sequences of signals from the control signal sequencer 105 for determining the states of interconnections of the elements A, B, C, and D of FIG. 1. In the test sequence the beam is first directed to the conductor A which charges in a positive direction and produces a falling waveform from the detector 107 as shown in the fifth line of FIG. 2 under the heading Charge A. The rising voltage on conductor A and the connected conductors C and D is shown in the sixth line of FIG. 2. The beam is next applied to the conductor B, which by design is isolated from the conductors A, C, and D and the resulting waveform from the detector 107 is similarly a falling wave as shown under the heading Charge B. The corresponding positive charging of the voltage on conductor B is shown in the next to the bottom line of FIG. 2. The resulting output signals of the sample and hold level comparator circuit 108 of FIG. 1 are processed in the analog to digital converter 109, the output of which is applied to the digital control processor 110. The two digital signals representative of the two positive output signals of level comparator 108 indicate to the digital control processor 110 that the conductors A and B are isolated one from the other.

The test sequence illustrated in FIG. 2 serves to erase the charge from the conductor A (also from the connected conductors C and D) and erase the charge from the isolated conductor B. Erase is effected by raising the backplate voltage as indicated in FIG. 2 while applying the electron beam first to the conductor A and then to the conductor B. The voltages on the conductors A and B rise simultaneously with the application of the positive signal to the backplate and the voltage on these conductors falls off to an equilibrium potential relative to the grid 106 upon the application of the electron beam to the conductors. This also is illustrated in FIG. 2. The rising waveforms at the output of the secondary electron detector 107 and the corresponding small negative output signals from the sample and hold level comparator are shown time displaced one from the other and from the Erase A and Erase B beam control signals shown on the first line of FIG. 2. Coincident with the return of the backplate voltage, the voltages on conductors A and B will fall to the same potential that existed before the test sequence was initiated.

The test sequence proceeds to charge the conductor C and to then charge conductor D to determine the state of isolation or interconnection of these two conductors. Since the conductor C is physically connected to the conductor A, the voltage on that conductor will rise during the charging thereof and the secondary emission from conductor C will initially be high and will fall until equilibrium is reached between the target conductor and the grid 106. This corresponds to the events which were described relative to the charging of conductors A and B. Conductor D as shown in FIG. 1 is physically connected to conductor C. Therefore, when in the test sequence the beam is applied to the conductor D, the secondary electron emission will remain fairly constant during the time the beam is on. Thus the waveform at the output of detector 107 is flat-topped and the corresponding signal from the sample and hold level comparator 108 is a zero level signal. The signals which are transmitted to the digital control processor 110 in response to the application of the electron beam to the conductors C and D will comprise a digital signal representing a falling secondary emission waveform and a flat-topped secondary emission waveform, respectively. The digital control processor 110 interprets these signals as indicating that the conductors C and D are as expected, connected one to the other. The remainder of the test sequence of FIG. 2 shows the application of a backplate voltage and the application of the electron beam to the conductors C and D to erase the charge from these conductors. Thus the board under test in FIG. 1 is in a condition such that the test sequence may be repeated.

Figure 3:
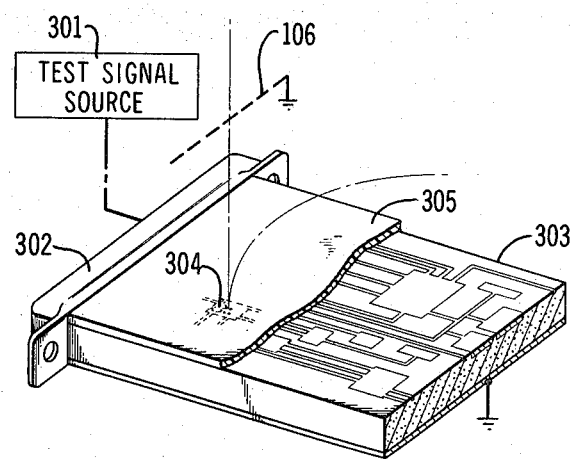
FIG. 3 shows a typical circuit board on which circuit components, including a connector, have been attached and one surface of the board encapsulated.

In summary, the above description sets forth a sequence for determining the state of isolation and connection of elements of a circuit board to which neither a connector nor circuit elements have been connected and which is free of an encapsulating surface. The following description relative to FIGS. 3 and 4 illustrates the application of the present invention to the testing of a circuit board which includes circuit elements, e.g., integrated circuit chips, a connector for the board, and a source of test signals for exercising the elements of the board to vary the voltages at internal circuit points of interest.

Figure 4:
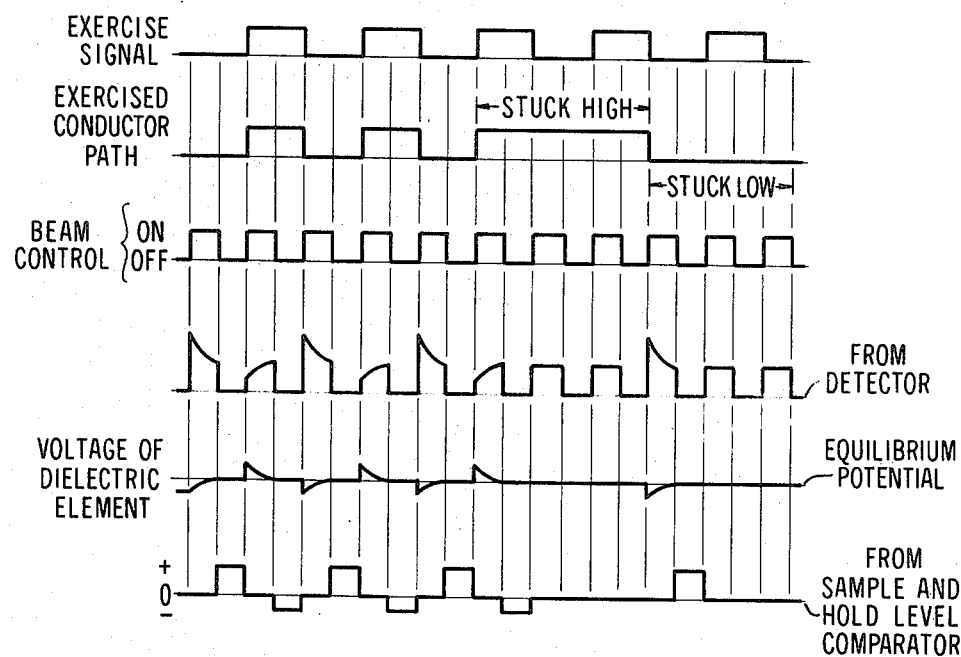
FIG. 4 is a time diagram of waveforms of FIG. 1 when an encapculated board such as shown in FIG. 3 is under test.

FIG. 4 illustrates a test sequence for observing electrical conditions of elements of an encapsulated printed board on which circuit elements, e.g., integrated circuit chips and a connector, have been attached. The first line of FIG. 4 shows the waveform of an "exercise signal" which is supplied from the test signal source 301 through the connector 302 to a circuit element of the board 303. A small area 304 of the encapsulating layer 305 is illustrated as lying over an element of the board, e.g., a conductor at the output of a gate. The position of the element 304 of the encapsulant is chosen to be over a circuit element on which the potential should vary in accordance with the applied exercise signal. The potential on such a circuit element is shown in the second line of FIG. 4 along side the heading "Exercised Conductor Path." For purposes of illustration the potential of the exercised conductor path faithfully follows the exercise signal for the first two pulses of the exercise signals and then remains stuck in the high state after the third exercise pulse and remains in the low state after the fourth exercise pulse. The control of the electron beam which impinges on the element 304 lying over the exercised conductor path is shown in the third line of FIG. 4. The beam control is synchronized to the exercise signal and the on time of the beam is of a duration such that the area 304 is targeted for a portion of each of the expected states of the exercised conductor path. Thus, as shown in the third line of FIG. 4, the beam is turned on prior to the first pulse of the exercise signal and is turned on and off during each high and low signal period of the exercise signal. As shown in FIG. 3, the area of the element 304 is exaggerated for purposes of illustration only. In actual practice the area of the element 304 is small and is electrically affected by only the circuit element lying immediately thereunder.

The targeted element 304 of the encapsulant 305, although comprised of nonconductive material, is capable of accepting a charge and of emitting secondary electrons in the same manner that a conductive element of the board emits secondary electrons. The exercising of the conductive element underlying a targeted nonconductive element, e.g., 304, corresponds to the previously described erasure of a charge by the application of positive signals to the backplate 101 of FIG. 1. The waveform of the secondary emission from the element 304 which reaches the detector such as 107 in FIG. 1 (but not shown in FIG. 3) is shown in the fourth line of FIG. 4. On the occurrence of the first control pulse to turn on the electron beam, the secondary emission from the element 304 is such that a falling waveform of secondary electrons appears at the detector. When the beam is turned on during a period of time that the exercised conductor path has gone to the high state, a rising waveform of secondary emission will reach the detector 107. It can be seen from a comparison of the waveform under the headings Erase A or Erase B in FIG. 2 and the waveform which occurs when the beam is turned on coincident with the exercise conductor being high, that erasure in FIG. 1 is a corresponding phenomenon. If the exercised conductor faithfully follows the illustrative exercise signals of FIG. 4, the output of the circuit 108 will alternate between a positive output signal and a negative output signal during successive sampling intervals. As will be illustrated later herein, failure of the exercised conductor to faithfully follow the exercise signals will result in either a positive or a negative output signal followed by one or more zero level output signals during successive sampling intervals.

The electrical state of the targeted element of the encapsulant after the action corresponding to erasure is dependent on the magnitude of the shift in potential on the underlying exercised conductor path. In the case of the test sequence of FIG. 2 relative to the unencapsulated board of FIG. 1, the shift in magnitude of the backplate voltage can be chosen to achieve zero potential relative to the grid 106 after erasure. However, when an encapsulated board is tested the change in magnitude of the voltage on the exercised conductor path is predetermined by the nature of the exercised circuitry and the element, e.g., 304 of the encapsulant, may return to a voltage slightly different than zero potential relative to the grid 106.

The proceeding discussion explains the waveshapes of the secondary emission which reach the detector when the exercised conductor path faithfully follows the exercise signal. The remainder of the test sequence of FIG. 4 illustrates the waveshapes which result when the exercised conductor path first stays high and subsequently stays low and does not follow the exercise signal completely. In each instance a first characteristic pulse, i.e., a rising waveform or a falling waveform, is followed by one or more flat-topped waves. The character (rising or falling) of the first pulse of the sequence establishes whether the conductor path has remained in the high or the low state.

As in the case of the test sequence of FIG. 2, the output of the detector circuit is applied to the sample and hold level comparator and the output thereof is processed in the analog to digital converter 109 to provide the appropriate responses to the digital control processor 110. In summary, it is possible to detect shifts in voltage on conductive elements underlying an encapsulant and thereby determine the operating states of a circuit board as reflected by changes in state at internal nodes which are physically inaccessible.

Although all of the above description has been with respect to relatively large elements, e.g., conductors and paths of printed circuit boards, it is to be understood that the principles of this invention can be applied also to the testing of much smaller electrical circuits, e.g., integrated circuit chips.

What is claimed is:

1. An arrangement for testing electrical circuits for continuity and isolation of conductive paths comprising:
   means for holding the circuit to be tested;
   an electron beam source;
   means for positioning beams from said source selectively on elements of said circuit;
   means for controlling said electron beam source to selectively generate electron beams of a selected energy level and selected time duration so as to create a positive charge on a targeted element;
   a grid interposed between said electron beam source and said circuit, a potential source connected to said grid to define a reference potential;
   means for measuring the magnitude of secondary electron emission from any selected circuit element of said electrical circuit under test as a function of time relative to the occurrence of an electron beam from said source on said selected element, means for generating signals defining the magnitude and time dependence of said secondary electron emission, and means for interpreting said signals.

2. An arrangement in accordance with claim 1 wherein said circuit under test comprises a circuit board comprising a conductive backplate, an insulating layer substantially parallel with and having a first major plane surface in intimate contact with said backplate and a plurality of conductive paths on the second major plane surface of said insulating layer and said arrangement further comprises means for selectively applying control signals to said backplate.

3. An arrangement in accordance with claim 1 wherein said circuit under test comprises a nonconductive layer having a plane surface, a plurality of conductive paths on said plane surface of said layer, a nonconductive layer overlying said conductive paths, and means for selectively applying potentials to at least certain of said conductive paths; and wherein said elements comprise portions of said overlying nonconductive layer.

4. An arrangement in accordance with claim 1 wherein said means for measuring the magnitude of secondary electron emission as a function of time comprises: a secondary electron emission detector for generating output signals corresponding to received secondary electron emission, a sample and hold level comparator circuit comprising: means for storing a first signal corresponding in absolute magnitude to the initial secondary electron emission resulting from the application of said electron beam to a target element, means for storing a second signal corresponding to the absolute magnitude of the secondary emission resulting from the application of said electron beam to a targeted element at a point in time displaced from the occurrence of the emission represented by said first signal, means for comparing said first and said second signals and for generating output signals defining the difference in magnitudes represented by said first and said second samples.

5. An arrangement in accordance with claim 1 wherein said energy level of said electron beam is selected to be of a value such that the ratio of secondary electron current to electron beam current is substantially greater than unity and said time duration is selected to be sufficiently long to permit the potential of the element targeted with said electron beam to reach an equilibrium potential relative to the potential of said grid.

6. The method of testing electrical circuits comprising the steps: (1) placing a circuit to be tested in a defined relation with a controllable electron beam source, a reference potential grid, and a secondary emission electron detector; (2) directing an electron beam of a selected energy level such that the secondary electron emission from an element of the circuit targeted by the beam substantially exceeds the electron beam current; (3) measuring the secondary electron emission from the targeted elements and generating discrete signals defining the time dependence of that secondary electron emission; and (4) interpreting said signals.

* * * * *

UNITED STATES PATENT OFFICE
CERTIFICATE OF CORRECTION

Patent No. 3,796,947          Dated March 12, 1974

Inventor(s) William L. Harrod, David K. Hindermann, and John M. Sebeson

It is certified that error appears in the above-identified patent and that said Letters Patent are hereby corrected as shown below:

The address of the assignee, "Murray Hill, Berkeley, Calif." should read --Murray Hill, Berkeley Heights, New Jersey--. Column 2, line 21, "fraction of beam" should read --function of beam--. Column 2, line 44, "board and the" should read --board and is--. Column 2, line 49, "group 11 to" should read --group 111 to--. Column 3, line 28, "basic steps which" should read --basic shapes which--. Column 3, line 42, "an equalibrium state" should read --an equilibrium state--. Column 5, line 38, "Erase is effected" should read --Erasure is effected--. Column 7, line 51, "The proceeding discussion" should read --The preceding discussion--.

Signed and sealed this 17th day of September 1974.

(SEAL)
Attest:

McCOY M. GIBSON JR.
Attesting Officer

C. MARSHALL DANN
Commissioner of Patents